W. S. STOTHOFF AND C. A. PSILANDER.
TRACTOR WHEEL.
APPLICATION FILED SEPT. 9, 1919.
1,352,635. Patented Sept. 14, 1920.
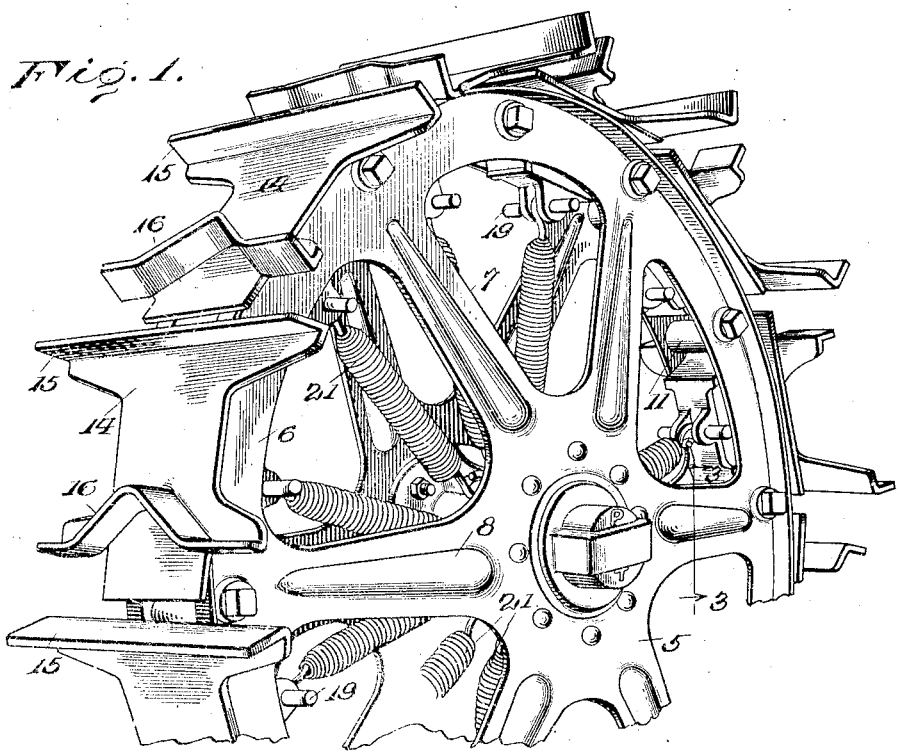

UNITED STATES PATENT OFFICE.

WILLIAM S. STOTHOFF AND CHARLES A. PSILANDER, OF EASTON, PENNSYLVANIA, ASSIGNORS TO WILLIAM WHARTON JR. & CO., INCORPORATED, OF EASTON, PENNSYLVANIA, A CORPORATION OF PENNSYLVANIA.

TRACTOR-WHEEL.

1,352,635.     Specification of Letters Patent.     Patented Sept. 14, 1920.

Application filed September 9, 1919. Serial No. 322,702.

*To all whom it may concern:*

Be it known that we, WILLIAM S. STOTHOFF and CHARLES A. PSILANDER, citizens of the United States, residing at Easton, in the county of Northampton and State of Pennsylvania, have invented certain new and useful Improvements in Tractor-Wheels, of which the following is a specification.

Our invention relates to wheels of the self-laying track type such as, for example, the tractor wheel shown in Letters Patent 1,298,781 to Pavesi and Tolotti.

Objects of our invention are to simplify and lessen the expense of manufacture of the wheel; to provide a comparatively light, yet rugged construction; to provide for variable suspension of the pads or track-laying units; to provide novel means for uniting the wheel sections without resorting to spot welding or the like; and to provide comparatively light, yet effective pads or ground engaging elements.

The nature, characteristic features and scope of the invention will more readily be understood from the following description taken in connection with the accompanying drawings, forming a part hereof, wherein—

Figure 1 is a perspective view of a tractor wheel embodying our invention.

Fig. 2 is a sectional view thereof.

Fig. 3 is a detail of one of the spoke elements.

Fig. 4 is a perspective view of one of the pads.

According to our invention, the wheel proper comprises two coincident skeleton disks, each consisting of inner and outer concentric rings 5 and 6 integrally connected by radial webs or spoke elements 7. For strengthening purposes and also to improve the general mechanical appearance of the wheel, the spoke elements are fluted or depressed, as at 8. The inner ring or hub carrying element 5 is provided with an appropriate hub 9, so that in general appearance, construction, and relation of parts the wheel is, as indicated in section in Fig. 2. The outer rings or rim elements 6 are equipped with cross-wise ranging bolts 10 constituting journals for the rollers 11. The bolts 10 are accommodated in eyelet bushings 12 in the rims, which prevent chafing of the rims by the bolts and nuts and also constitute thrust provisions for the rollers.

As in the patent, hereinbefore referred to, the pads or track-laying units are relatively floating with respect to the wheel, being guided by the double rim and supported by devices radiating from the hub.

According to our invention the pads comprise a central upwardly extending web 13, the extended bottom 14 of which is equipped with a pair of ground engaging cleats 15 and 16, whereof the former is a straight transverse offset and whereof the latter is of a general V formation.

The webs 13 are accommodated between the wheel rim elements 6, and their ends 17 have a radius or curve to enable them to coöperate with the rollers 10 in the manner alluded to in the patent. There are lugs 18 on the webs 13, with eyes to receive a cross-pin 19. The pins 19 are of sufficient length to overhang the rims 6 so that they will straddle said rims and prevent loss of the pads should the latter become disconnected.

The pins 19 are provided with central annular grooves 20, and the pad supports or coiled springs 21 radiating from the hub have ring-like extensions 22 which pass between the lugs and engage said grooves. It may here be remarked that the specific construction of the pins 19 and their relative arrangement forms no part of the present invention.

We provide an additional lug 23 for direct engagement of the coiled springs in order to vary the action of the pads according to the type of tractor with which the wheels are used. In this event, the pins 19 would still occupy the other lugs.

Having described our invention, we claim: —

1. A wheel of the type recited comprising the combination with floating pads or track-laying units, of a pair of skeleton disks having hub-carrying elements and rim elements integrally united by fluted webs or spokes, bolts connecting the rims and constituting journals, rollers mounted thereon and coöperating with the pads, and eyelet bushings in the rims to accommodate the bolts and constituting thrust provisions for the rollers.

2. In a wheel of the type recited, rims having cross-wise ranging bolts constituting journals, rollers thereon, and eyelet bushings in the rims to accommodate the bolts and constituting thrust provisions for the rollers.

3. In a wheel of the type recited, pads having two sets of lugs, spring supports adapted to either set for varying the action of the pads, and rim-straddling devices carried by the other set to prevent loss of pads.

In testimony whereof we affix our signatures.

WILLIAM S. STOTHOFF.
CHARLES A. PSILANDER.